United States Patent

[11] 3,625,968

| [72] | Inventors | Albrecht Zschocke<br>Bad Duerkheim;<br>Karl-Heinz Koenig, Ludwigshafen am Rhine; Gustav Steinbrunn,<br>Schwegenheim/Pfalz, all of Germany |
|---|---|---|
| [21] | Appl. No. | 696,138 |
| [22] | Filed | Jan. 8, 1968 |
| [45] | Patented | Dec. 7, 1971 |
| [73] | Assignee | Badische Anilin- & Soda-Fabrik Aktiengesellschaft<br>Ludwigshafen am Rhine, Germany |
| [32] | Priority | Jan. 12, 1967 |
| [33] | | Germany |
| [31] | | P 16 70 180.7 |

[54] PRODUCTION OF TETRAHYDRO-1,2,4-OXADIAZINE-3,5-DIONES
1 Claim, No Drawings

[52] U.S. Cl. .................................................. 260/244,
71/92, 424/248, 260/453, 260/500.5
[51] Int. Cl. .......................................................... C07d 87/52
[50] Field of Search ........................................... 260/244

[56] References Cited
UNITED STATES PATENTS

| 3,238,200 | 3/1966 | Bernstein et al. .............. | 260/244 |
| 3,438,985 | 4/1969 | Bernstein et al. .............. | 260/244 |

FOREIGN PATENTS

| 88,394 | 12/1966 | France .......................... | 260/244 |
| 1,432,738 | 2/1966 | France .......................... | 260/244 |

OTHER REFERENCES

Werner et al., Ber. Deut. Chem. vol. 29, pages 2654 to 2655 (1896)

Houben-Weyl, Methoden der Organischen Chemie, 4th Ed. Band XI/2, pages 521 and 531, Georg Thieme Verlag, Stuttgart, Germany Kornowski et al., Bull. Soc. Chim. France 1966, pages 679 to 686

*Primary Examiner*—John D. Randolph
*Attorney*—Johnson, Root, O'Keeffe, Keil, Thompson & Shurtleff ABSTRACT: The production of substituted tetrahydro-1,2,4-oxadiazine-3,5-diones by the reaction of open-chain substituted N-(α-carboxy)-alkoxyureas with cyclizing agents in the form of chlorides or bromides of phosphoric acid, phosphorous acid, sulfurous acid or carbonic acid. The products of the process (some of which are new substances) are herbicides, diuretic and antiphlogistic pharmaceuticals and valuable starting products for the production of pesticides and pharmaceuticals.

PRODUCTION OF TETRAHYDRO-1,2,4-OXADIAZINE-3,5-DIONES

This invention relates to the production of tetrahydro-1,2,4-oxadiazine-3,5-diones by cyclization of substituted N-(α-carboxy)-alkoxyureas.

It is known from U.S. Pat. No. Specification No. 3,238,200 that tetrahydro-1,2,4-oxadiazine-3,5-diones are obtained by basic cyclization of the carboxy esters of open-chain substituted N-(α-carboxy)-alkoxyureas with metal oxides, preferably sodium methoxide or sodium ethoxide. The starting materials for this method are obtained from O-hydroxylamine compounds having the general formula

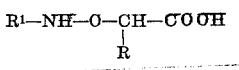

which are esterified in the form of the acid or preferably in the form of the hydrochloride; the esters are then reacted with substituted isocyanates to form the corresponding N-(α-carbalkoxy)-alkoxyurea derivatives. The method of production of the said O-hydroxylamine compounds is not disclosed.

The object of this invention is a new process for the production of substituted tetrahydro-1,2,4-oxadiazine-3,5-diones in good yields, high purity and in a simple way by reaction of open-chain substituted N-(α-carboxy)-alkoxyureas with cyclizing agents in the form of chlorides or bromides of phosphoric acid, phosphorous acid, sulfurous acid or carbonic acid.

This and other objects of the invention are achieved and tetrahydro-1,2,4-oxadiazine-3,5-diones having the general formula

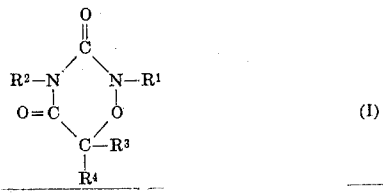

in which $R^1$ and $R^2$ may be identical or different and each denotes an aliphatic, araliphatic, cycloaliphatic or aromatic radical attached by way of a carbon atom, $R^1$ may also denote a hydrogen atom, and $R^2$ may also denote an arysulfonyl radical or a heterocyclic radical, $R^3$ denotes a hydrogen atom or an alkyl radical and $R^4$ denotes a hydrogen atom or an aliphatic, araliphatic or aromatic radical, are advantageously obtained by treating an open-chain substituted N-(α-carboxy)-alkoxyurea having the general formula

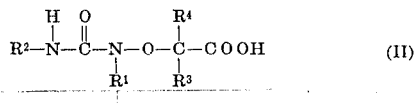

in which $R^1$, $R^2$, $R^3$ and $R^4$ have the above meanings, with a chloride or bromide of phosphoric acid, phosphorous acid, sulfurous acid or carbonic acid as cyclizing agent at from 0° to 150° C., preferably from 25° to 100° c., in the presence or absence of cyclization catalysts.

In the process according to this invention, the additional step of esterifying the starting material is dispensed with. The yields of tetrahydro-1,2,4-oxadiazine-3,5-diones, with reference to N-(α-carboxy)-alkoxyureas, are higher than in the method according to the said U.S. Pat. Specification. Moreover the end products prepared according to this invention crystallize more easily and contain less impurities.

The open-chain substituted N-(α-carboxy)-alkoxyureas having the general formula (II) which serve as starting materials may be prepared as follows:

N-hydroxyureas having the general formula (III):

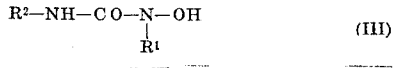

in which $R^1$ and $R^2$ have the above meanings (which compounds in turn are obtainable by reaction of appropriate isocyanates with appropriate hydroxylamines) are reacted in the form of their alkali metal salts or alkaline earth metal salts in aqueous or aqueous-alcoholic solution with an equivalent amount of an α-halocarboxylic acid in the presence of alkali, for example potassium hydroxide, at from 0° to 130° C., preferably from 25° to 80° C., for one to twenty-four hours; it is advantageous to neutralize the α-halocarboxylic acid previously with an equivalent amount of alkali, for example alkali metal carbonate. The N-(α-carboxy)-alkoxyurea is separated from the reaction mixture by a conventional method, for example by acidification, suction filtration, washing and drying of the precipitate obtained.

In the tetrahydro-1,2,4-oxadiazine-3,5-diones having the formula (I) and accordingly also in the N-(α-carboxy)-alkoxyureas having the formula (II), $R^1$ and $R^2$ may denote aliphatic, araliphatic, cycloaliphatic or aromatic radicals and $R^2$ may also denote a heterocyclic radical or an arylsulfonyl radical. The said radicals may bear, as substituents, groups or atoms which are inert under the reaction conditions. Such groups and atoms include: halogen atoms, alkyl groups, aryl groups, aralkyl groups, cycloalkyl groups, heterocyclic groups, cyano groups, nitro groups, sulfonic acid groups, sulfonamido groups alkysulfonyl groups, trifluoromethyl groups, alkoxy groups, aroxy groups, alkylmercapto groups, arylmercapto groups, alkylamino groups, carboxyl groups, carbamide groups or carboxylate groups. $R^3$ in formulas (I) and (II) may denote a hydrogen atom or an alkyl radical, and $R^4$ may denote a hydrogen atom, an aliphatic radical, an araliphatic radical or an aromatic radical; the said radicals may also bear substituents as described in respect of $R^1$ and $R^2$.

N-(α-carboxy)-alkoxyureas (II) which are preferred as starting materials and preferred tetrahydro-1,2,4-oxadiazine-3,5-diones (I) are those in whose formula $R^1$ denotes a hydrogen atom, an alkyl radical having one to five carbon atoms, an alkenyl radical having two to four carbon atoms, an aralkyl radical having seven to ten carbon atoms, a cycloalkyl radical having five to twelve carbon atoms or a phenyl radical which may bear, as substituents, one or more halogen atoms and/or alkyl groups having one to five carbon atoms, $R^2$ denotes an alkyl radical having one to ten carbon atoms or an alkenyl radical having two to six carbon atoms (both of which radicals may bear, as substituents, one or more halogen atoms, cyano groups, carbamido groups, alkoxy groups having one to three carbon atoms and/or alkylmercapto groups having one to three carbon atoms), an aralkyl radical having seven to ten carbon atoms (which may bear one or more halogen atoms as substituents), a cycloalkyl radical having five to twelve carbon atoms, a phenyl or naphthyl radical (both of which may bear as substituents, one or more halogen atoms, trifluoromethyl groups, sulfonamide groups, nitro groups, p-chlorophenoxy groups, alkylamino groups having one to three carbon atoms, alkyl groups having one to four carbon atoms, alkoxy groups having one to four carbon atoms and/or alkylmercapto groups having one to four carbon atoms), an arysulfonyl radical having six to ten carbon atoms (which may bear, as substituents, one or more halogen atoms and/or alkyl groups having one to three carbon atoms), a five-membered or six-membered ring having one or two nitrogen atoms, oxygen atoms and/or sulfur atoms as members of the ring, a further five-membered or six-membered ring having one or two nitrogen atoms, oxygen atoms and/or sulfur atoms as members of the ring being condensed onto the ring if desired. $R^3$ denotes a hydrogen atom or an alkyl radical having one to five carbon atoms, $R^4$ denotes a hydrogen atom, an alkyl radical having one to five carbon atoms, a phenyl radical or an aralkyl radical having seven carbon atoms, the two last-mentioned radicals if desired bearing one or more halogen atoms as substituents.

For example the following N-(α-carboxy0-alkoxyureas may be used as starting materials: N-3,4-dichlorophenyl-N'-methyl-N'-(α-carboxy)-methoxyurea, N-methyl-N'-benzyl-N'-(α-carboxy)-methoxyurea, N-3-trifluoromethylphenyl-N'-ehtyl-N'-(α-carboxy)-benzyloxyurea, N-3-sulfonamido-4- chlorophenyl-N'-methyl-N'-(α-carboxy)-ethoxyurea, N-benzyl-N'-methyl-N'-(α-carboxy)-methoxyurea, N-cyclohexyl-N'-methyl-N'-(α-carboxy-α-methyl)-ethoxyurea, N-methyl-N'-4-bromophenyl-N'-(α-carboxy)-isobutoxyurea, N-isopropyl-N'-2-methylcyclohexyl-N'-(α-carboxy)-methoxyurea, N-β-chloropropyl-N'-isopropyl-N'-(α-carboxy-βphenyl)-ethoxyurea, N-4-toluenesulfonyl-N'-methyl-N'-(α-carboxy)-methoxyured..

Chlorides or bromides of phosphoric acid, phosphorous acid, sulforous acid and carbonic acid are used as cyclizing agents; for example phosphorus pentachloride, phosphorus oxychloride, phosphorus trichloride, thionyl chloride, phosgene and the analogous bromides may be used. If the cyclizing agent is in solid form, it may advantageously be added to the cyclization mixture by scattering it in portions. If the cyclizing agent is a liquid, it may be dripped slowly into the cyclization mixture. If the cyclizing agent is a gas, it may be passed through the cyclization mixture. The cyclizing agent may be added in a stoichiometric amount, i.e. one equivalent of cyclizing agent per mole of starting material (II), or in excess, preferably an excess of twice to five times, with reference to N-(α-carboxy)-alkoxyurea.

As a rule, the process is carried out in the temperature range from 0° to 150° C., preferably from 25° to 100° C.

Cyclization catalysts, for example dimethyl formamide, dimethyl acetamide, dimethyl propionamide, dimethyl benzamide, diethyl formamide, or N-methylpyrrolidone, may be used in the cyclization; it is advantageous to add them to the solution of N-(α-carboxy)-alkoxyurea in an amount of 1 to 10 percent by weight with reference to the starting material (II) prior to cyclization.

The process according to this invention is advantageously carried out in a solution or suspension of the N-(α-carboxy)-alkoxyurea. Solvents or suspension agents which are inert under the cyclization conditions are used for this purpose; examples of suitable compounds are cyclic ethers, such as tetrahydrofuran and dioxane; aromatic hydrocarbons, such as toluene and xylene; and cycloaliphatic hydrocarbons, such as cyclohexane.

The reaction may be carried out as follows: the N-(α-carboxy)-alkoxyurea is dissolved or suspended in a solvent or suspension agent which is indifferent under the cyclization conditions, in the presence or absence of a cyclization catalyst, and the cyclizing agent is added, while mixing well, to the resultant solution or suspension at 0° to 150° C., preferably at 25° to 100° C. All apparatus or equipment commonly used for the production of mixed liquid phases may be used for mixing the cyclization medium; examples are flatblade paddle mixers, gate paddle mixers, propeller mixers, impeller mixers, vibromixers, vibrating equipment, turbine impellers or column apparatus. When using a gaseous cyclizing agent, this may be passed into the mixture in a state of fine division so that the desired mixing effect is achieved. The reaction mixture is stirred well for a further period, for example one to three hours, at from 0° to 150° C., preferably from 25° to 100° C. Separation of the compounds to be prepared by the present process may be carried out by conventional methods, for example by fractional distillation, extractive distillation or extraction.

Compounds which can be prepared by the process according to the invention are valuable starting materials for pharmaceuticals and pesticides. They may also be used as diuretic and antiphlogistic pharmaceuticals and as herbicides.

Thus for example agricultural areas may be treated with them by the process according to U.S. Pat. application Ser. No. 648,239, now U.S. Pat. No. 3,537,839, in order to control unwanted vegetation without damaging crop plants.

The invention is illustrated by the following examples in which parts are by weight.

EXAMPLE 1 a. N-3-nitrophenyl-N'-methyl-N'-(α-carboxy)-methoxyurea: 21.1 parts of N-3-nitrophenyl-N'-methyl-N'-hydroxyurea is suspended in 100 parts of water and mixed at room temperature while stirring well with six parts of potassium hydroxide which has been dissolved in 10 parts of water. A solution of 10 parts of chloroacetic acid in 10 parts of water (which has previously been neutralized at 10° C. with the calculated amount of sodium carbonate solution) is dripped into the resultant solution at 30° to 40° C. The resultant mixture is then stirred for two to four hours at a temperature of 45° C. and then allowed to stand overnight at room temperature. The whole is then acidified with dilute hydrochloric acid while cooling and the precipitate formed is suction filtered, washed with water and dried. 22.6 parts (84 percent of the theory) of N-3-nitrophenyl-N'-methyl-N'-(α-carboxy)-methoxyurea is obtained having a melting point of 175° to 177° C.

b. 2-methyl-4-(3'-nitrophenyl)-tetrahydro-1,2,4-oxadiazine-3,5-dione:

12 parts of thionyl chloride is dripped while stirring at from 60° to 70° C. into a solution of 13.5 parts of N-3-nitrophenyl-N'-methyl-N'-(α-carboxy)-methoxyurea in 50 parts of tetrahydrofuran and the mixture is then stirred for another two hours at 70° C. The precipitate which is formed when the mixture is cooled is suction filtered and dried. 10.9 parts (87 percent of the theory) of 2-methyl-4-(3'-nitrophenyl)-tetrahydro-1,2,4-oxadiazine-3,5-dione is obtained having a melting point of 168° to 170° C.

EXAMPLE 2 a. N-methyl-N'-phenyl-N'-(α-carboxy)-methoxyurea:

33.2 parts of N-methyl-N'-phenyl-N'-hydroxyurea is suspended in 200 parts of water and mixed with 12 parts of potassium hydroxide (dissolved in 20 parts of water) with good stirring at room temperature. A solution of 20 parts of chloroacetic acid in 20 parts of water (which has previously been neutralized at 10° C. with the calculated amount of sodium carbonate solution) is added dropwise to the resultant solution at 30° to 40° C. The mixture is then stirred for two to four hours at a temperature of 45° C. and allowed to stand overnight at room temperature. The whole is then acidified with dilute hydrochloric acid and the precipitate formed is suction filtered, washed with water and dried. 35 parts (78 percent of the theory) of N-methyl-N'-phenyl-N'-(α-carboxy)-methoxyurea is obtained having a melting point of 128° to 130° C.

b. 2-phenyl-4-methyltetrahydro-1,2,4-oxadiazine-3,5-dione:

22.4 parts of N-methyl-N'-phenyl-N'-(α-carboxy)methoxyurea dissolved in 100 parts of dioxane has 24 parts of thionyl chloride added thereto dropwise at 60° to 70° C. while stirring and the mixture is then stirred for another two hours at 80° C. The mixture is then allowed to cool and is evaporated to dryness in vacuo. The residue is recrystallized from ethanol. 16.5 parts (80.5 percent of the theory) of 2-phenyl-4-methyl-tetrahydro-1,2,4-oxadiazine-3,5-dione is obtained having a melting point of 94° to 96° C.

EXAMPLE 3 a. N-3-chlorophenyl-N'-methyl-N'-(α-carboxy)-ethoxyurea:

40 parts of N-3-chlorophenyl-N'-methyl-N)-hydroxyurea is suspended in 200 parts of water and mixed at room temperature while stirring with 12 parts of potassium hydroxide which has been dissolved in 20 parts of water. A solution of 30 parts of α-bromopropionic acid in 20 parts of (which has previously been neutralized at 5° C. with the calculated amount of sodium carbonate solution) is dripped into the resultant solution at 30° to 40° C. The mixture is then stirred for another two to four hours at a temperature of 55° C. and allowed to stand overnight at room temperature. It is then acidified with dilute hydrochloric acid while cooling, and the precipitate formed is suction filtered, washed with water and dried. 44 parts (81 percent of the theory) of N-3-chlorophenyl-N'-methyl-N'-(α-carboxy)-ethoxyurea is obtained having a melting point of 131° to 133° C.

b. 2-methyl-4-(3'-chlorophenyl)-6-methyltetrahydro-1,2,4-oxadiazine-3,5-dione:

A current of phosgene (60 parts per hour) is passed into 27.2 parts of N-3-chlorophenyl-N'-methyl-N'-(α-carboxy)-ethoxyurea (dissolved in 100 parts of tetrahydrofuran containing 1 part of dimethyl formamide), the temperature of the mixture thus rising to 55° C. The mixture is then stirred for another hour at 75° C. and cooled. A current of nitrogen is passed through for half an hour and the solution is then evaporated to dryness in vacuo. The residue is recrystallized from ethanol. 23.6 parts (93 percent of the theory) of 2-methyl-4-(3'-chlorophenyl)-6-methyltetrahydro-1,2,4-oxadiazine-3,5-dione is obtained having a melting point of 120° to 122° C.

EXAMPLE 4 a. N-3,4-dichlorophenyl-N'-methyl-N'-(α-carboxy-α-methyl)-ethoxyurea:

47 parts of N-3,4-dichlorophenyl-N'-methyl-N'-hydroxyurea is suspended in 200 parts of water and while stirring well at room temperature mixed with 12 parts of potassium hydroxide which has been dissolved in 20 parts of water. A solution of 33.4 parts of α-bromoisobutyric acid in 50 parts of 50 percent ethanol which has previously been neutralized with the calculated amount of sodium hydroxide is added dropwise at 30° to 40° C. to the resultant mixture. The mixture is then stirred for another two to four hours at a temperature of 60° C. and allowed to stand overnight at room temperature. The whole is then acidified with dilute hydrochloric acid while cooling and the resultant precipitate is suction filtered, washed with water and dried. 39.7 parts (62 percent of the theory) of N-3,4-dichlorophenyl-N'-methyl-N'-(α-carboxy-α-methyl)-ethoxyurea is obtained having a melting point of 98° to 100° C.

b. 2-methyl-4-(3',4'-dichlorophenyl)-6,6-dimethyl-tetrahydro-1,2,4-oxadiazine-3,5-dione:

7.6 parts of phosphorus oxychloride is added dropwise at room temperature to 16 parts of N-3,4-dichlorophenyl-N'-methyl-N'-(α-carboxy-α-methyl)-ethoxyurea which is suspended in 100 parts of p-xylene containing two parts of diethyl formamide. The mixture obtained is stirred for another two hours at 90° C. and cooled. The precipitate formed is suction filtered, adherent solvent is separated by vacuum drying and the residue washed well with water and dried. 12.5 parts (83 percent of the theory) of 2-methyl-4-(3',4'-dichlorophenyl)-6,6-dimethyltetrahydro-1,2,4-oxadiazine-3,5-dione is obtained having a melting point of 99° to 101° C.

EXAMPLE 5 a. N-2-chloroethyl-N'-3,3-dichloroephenyl-N'-(α-carboxy)-methoxyurea:

56.8 parts of N-2-chloroethyl-N'-3,4-dichlorephenyl-N'-hydroxyurea is suspended in 200 parts of water and mixed while stirring well at room temperature with eight parts of sodium hydroxide dissolved in 20 parts of water. A solution of 20 parts of water (which has previously been neutralized at 5° C. with the calculated amount of sodium carbonate) is added dropwise at 30° to 40° C. to the mixture thus obtained. The mixture is then stirred for another two to four hours at a temperature of 50° C. The whole is then acidified with dilute hydrochloric acid while cooling, and the resultant precipitate is suction filtered, washed with water and dried. 50 parts (73.5 percent of the theory) of N-2-chloroethyl-N'-3,4-dichlorphenyl-N'-(α-carboxy)-methoxyurea is obtained having a melting point of 98° to 100° C.

b. 2-(3',4'-dichlorophenyl)-4-(2'-chloroethyl)-tetrahydro-1,2,4-oxadiazine-3,5-dione:

2.8 parts of phosphorus trichloride is dripped at room temperature into 17 parts of N-2-chloroethyl-N'-3,4-dichlorophenyl-N'-(α-carboxy)-methoxyurea suspended in 100 parts of cyclohexan containing two parts of dimethyl formamide. The mixture is stirred for another two hours at 70° C. and allowed to cool. The precipitate formed is suction filtered and, after adherent solvent has been removed by vacuum drying, washed well with water, and dried. 13.3 parts (83 percent of the theory) of 2-(3',4'-dichlorophenyl)-4-(2'-chloroethyl)-tetrahydro-1,2,4-oxadiazine-3,5-dione is obtained having a melting point of 93° C.

EXAMPLE 6

2-phenyl-4-methyltetrahydro-1,2,4-oxadiazine-3,5-dione:

The procedure of example 2 is followed but 30 parts of thionyl bromide is used instead of 24 parts of thionyl chloride. The same yield of end product is obtained.

Compounds having the formula:

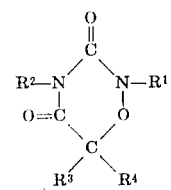

in which $R^1$, $R^2$, $R^3$ and R4 have the meanings given in the following Table can be obtained by following a procedure analogous to that in examples 1 or 3. They have the melting points (m.p.) shown.

| 1 | 2 | 3 | 4 | Melting point (° C.) |
|---|---|---|---|---|
| $CH_3-$ | 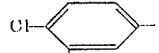 Cl-phenyl-Cl | H | H | 10 |
| $CH_3-$ | Same as above | H | 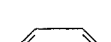 phenyl | 156 |
| $CH_3-$ |  phenyl-$CF_3$ | H | H | 53–55 |
| $CH_3$\\CH—/$CH_3$ | Cl-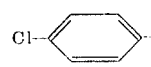phenyl | H | H | 111–11² |
| $CH_3-$ | 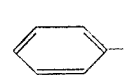 phenyl | H | H | 140–142 |

| 1 | 2 | 3 | 4 | Melting point (°C.) |
|---|---|---|---|---|
| CH₃— | (bicyclic structure) | H | H | Oil |
| (CH₃)₂CH— | 3,4-dichlorophenyl | H | H | 151–153 |
| H | 4-chlorophenyl | H | H | 210–212 |
| CH₃— | 4-chloro-3-methylphenyl | H | H | 107–110 |
| CH₃— | 2,5-dimethoxyphenyl | H | H | 90–91 |
| CH₃— | 4-methylphenyl | H | H | 115–117 |
| CH₃— | 4-bromophenyl | H | H | 140–144 |
| 4-chlorophenyl | (CH₃)₂CH— | H | H | 63–64 |
| 3,4-dichlorophenyl | CH₃— | H | H | 108–110 |
| CH₃— | 4-chlorophenyl | H | CH₃ | 135–136 |
| CH₃— | cycloheptyl (H) | H | H | Oil |
| CH₃— | CH₃—(CH₂)₃—CH(C₂H₅)—CH₂— | H | H | Oil |
| CH₃— | benzyl (C₆H₅—CH₂—) | H | H | Oil |
| CH₃— | 4-(4-chlorophenoxy)phenyl | H | H | 141–143 |
| CH₃— | naphthyl | H | H | 104–106 |
| phenyl | CH₃— | H | CH₃— | 63 |
| cyclohexyl (H) | phenyl | H | CH₃ | 112–113 |
| cyclohexyl (H) | (CH₃)₂CH— | H | H | 71–72 |

We claim:
1. A process for the production of tetrahydro-1,2,4-oxadiazine-3,5-diones having the general formula:

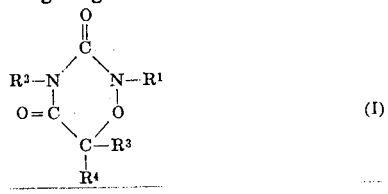

(I)

in which R¹ denotes hydrogen, alkyl of one to five carbon atoms, alkenyl of two to four carbon atoms, aralkyl of seven to ten carbon atoms, cycloalkyl of five to twelve carbon atoms, phenyl, or phenyl substituted by one or more halogen atoms and/or alkyl groups having one to five carbon atoms; R² denotes alkyl of one to ten carbon atoms or alkenyl of two to six carbon atoms or said alkyl or alkenyl substituted by one or more halogen atoms, cyano groups, carbamido groups, alkoxy groups having one to three carbon atoms and/or alkylmercapto groups having one to three carbon atoms, aralkyl of seven to ten carbon atoms or said aralkyl substituted by one or more halogen atoms, cycloalkyl of five to twelve carbon atoms, phenyl, naphthyl or said phenyl or said naphthyl substituted by one or more halogen atoms, trifluoromethyl groups, sulfonamido groups, nitro groups, p-chlorophenoxy groups, alkylamino groups having one to three carbon atoms, alkyl groups having one to four carbon atoms, alkoxy groups having one to four carbon atoms and/or alkylmercapto groups having one to four carbon atoms; $R^3$ denotes hydrogen or alkyl of one to five carbon atoms; R4 denotes hydrogen, alkyl of one to five carbon atoms, phenyl or aralkyl radical having seven carbon atoms, the two last-mentioned radicals if desired bearing one or more halogen atoms as substituents wherein an open-chain substituted N-($\alpha$-carboxy)-alkoxy-urea having the general formula:

$$R^2-\underset{\underset{R^1}{|}}{N}-\overset{H}{\underset{|}{C}}-\overset{O}{\underset{}{C}}-N-O-\underset{\underset{R^3}{|}}{\overset{R^4}{\underset{|}{C}}}-COOH \quad (II)$$

in which $R^1$, $R^2$, $R^3$ and $R^4$ have the above meanings, is treated with phosphorus trichloride, phosphorus tribromide, phosphorus pentachloride, phosphorus pentabromide, phosphorus oxychloride, phosphorus oxybromide thionyl chloride, thionyl bromide, phosgene or carbon oxybromide as a cyclizing agent in the presence of a cyclization catalyst selected from the group consisting of dimethyl formamide, dimethyl acetamide, dimethyl propionamide, dimethyl benzamide, diethyl formamide and N-methylpyrrolidone, at a temperature of from 0° to 150° C.

* * * * *

PO-1050
(5/69)

UNITED STATES PATENT OFFICE
CERTIFICATE OF CORRECTION

Patent No. 3,625,968          Dated December 7, 1971

Inventor(s) Albrecht Zschocke et al

It is certified that error appears in the above-identified patent and that said Letters Patent are hereby corrected as shown below:

Column 2, line 25, "fonamido groups alkylsulfonyl" should read -- fonamido groups, alkylsulfonyl --; line 71, "N-($\alpha$-carboxyO-alkoxyureas" should read -- N-($\alpha$-carboxy)-alkoxyureas --; line 75, "ehtyl" should read -- ethyl --.

Column 3, line 8, "methoxyured.." should read -- methoxyurea. --.

Column 6, line 18, "dichlorphen-" should read -- dichlorophen- --; in the table, first line "10$^9$" should read -- 109 --; fourth line, "11$^2$" should read -- 112 --.

Signed and sealed this 30th day of May 1972.

(SEAL)
Attest:

EDWARD M. FLETCHER, JR.        ROBERT GOTTSCHALK
Attesting Officer               Commissioner of Patents